(12) United States Patent
Van Gassel et al.

(10) Patent No.: US 8,762,578 B2
(45) Date of Patent: Jun. 24, 2014

(54) METHOD OF DATA SYNCHRONIZATION

(75) Inventors: Jozef Pieter Van Gassel, Eindhoven (NL); Hendrikus Bernardus Van Den Brink, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1329 days.

(21) Appl. No.: 11/569,077

(22) PCT Filed: May 3, 2005

(86) PCT No.: PCT/IB2005/051442
§ 371 (c)(1),
(2), (4) Date: Nov. 14, 2006

(87) PCT Pub. No.: WO2005/114472
PCT Pub. Date: Dec. 1, 2005

(65) Prior Publication Data
US 2008/0109561 A1 May 8, 2008

(30) Foreign Application Priority Data

May 18, 2004 (EP) .................................... 04102192

(51) Int. Cl.
*G06F 15/16* (2006.01)
*G06F 15/177* (2006.01)
*H04L 29/08* (2006.01)
*G06F 17/30* (2006.01)
*H04L 12/56* (2006.01)

(52) U.S. Cl.
CPC ...... *H04L 67/1095* (2013.01); *G06F 17/30581* (2013.01); *G06F 17/30082* (2013.01); *H04L 47/823* (2013.01)

USPC .......................................... 709/248; 709/221

(58) Field of Classification Search
CPC .................. G06F 17/30082; G06F 17/30581; H04L 47/823; H04L 67/1095
USPC .......................................... 709/220, 221, 248
See application file for complete search history.

(56) References Cited

U.S. PATENT DOCUMENTS

| | | | |
|---|---|---|---|
| 6,182,133 B1 * | 1/2001 | Horvitz | 709/223 |
| 6,198,696 B1 * | 3/2001 | Korpi et al. | 368/21 |
| 6,360,346 B1 | 3/2002 | Miyauchi et al. | |
| 6,442,658 B1 * | 8/2002 | Hunt et al. | 711/158 |

(Continued)

OTHER PUBLICATIONS

Goose et al, "Mobile Reality: A PDA-Based Multimodal Framework Synchronizing a Hybrid Tracking Solution With 3D Graphics and Location-Sensitive Speech Interaction", UBICOMP 2002: Ubiquitous Computing. 4th International Conference, Proceedings (Lecture Notes in Computer Science vol. 2498), Abstract.

(Continued)

*Primary Examiner* — Brian J Gillis

(57) ABSTRACT

There is described a method of synchronization in a personal information entertainment product (10) for periodically updating data content stored in memory (50) of the product (10). Moreover, apparatus (10), for example advanced personal information entertainment products, capable of operating according to the method are elucidated. A system and software operable to implement the method are also disclosed. The method relates to data synchronization in a personal information-entertainment device (10) operable to present data content to a user (20) of the device (10), the method including steps of: (a) arranging for the device (10) to determine one or more contexts (410) in which it is to be used; and (b) updating data content stored in the device (10) in response to the one or more contexts (410).

19 Claims, 2 Drawing Sheets

(56) References Cited

U.S. PATENT DOCUMENTS

Figure 1:
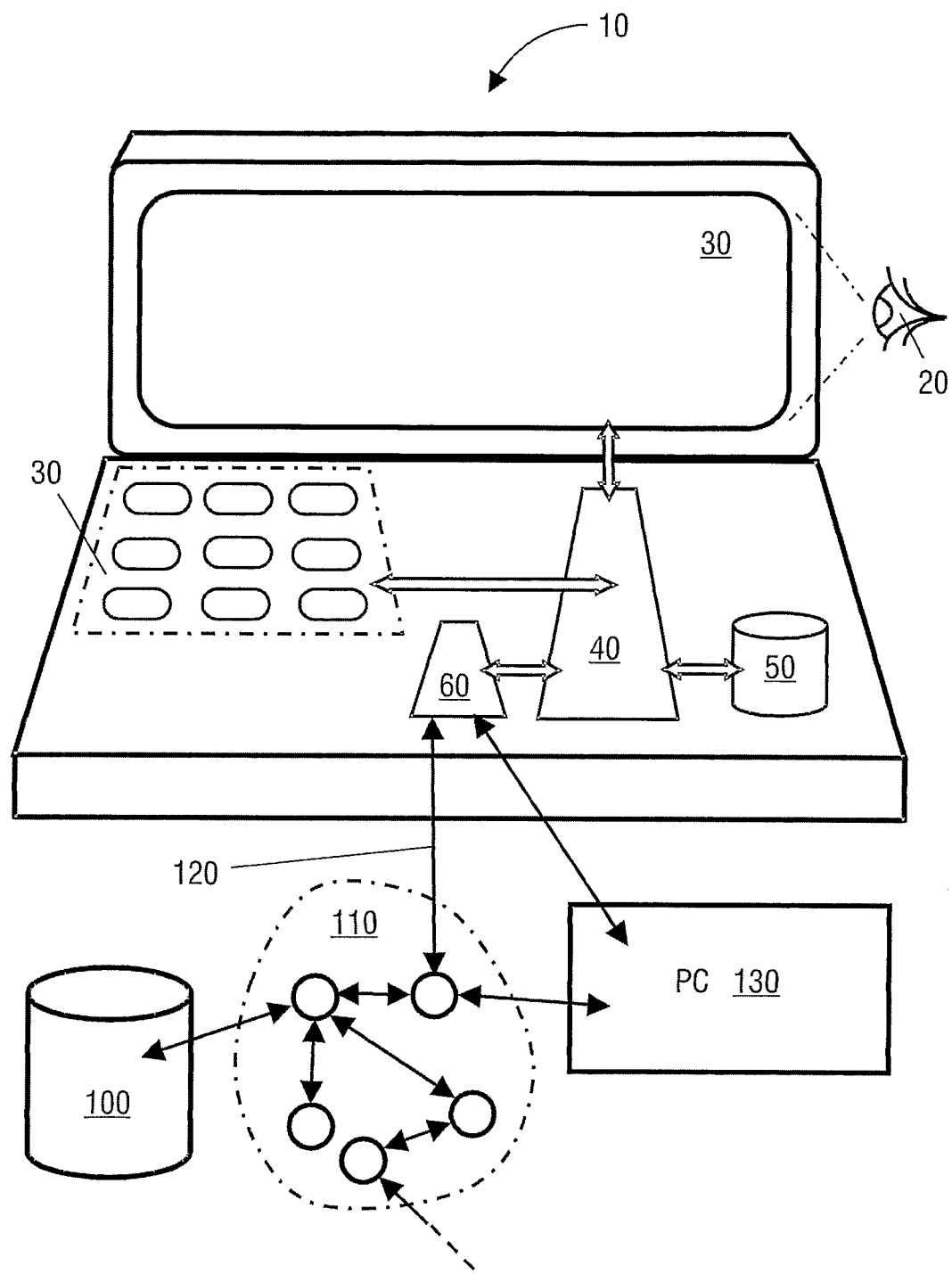

| | | |
|---|---|---|
| 6,452,544 B1 | 9/2002 | Hakala et al. |
| 6,883,019 B1 * | 4/2005 | Sengupta et al. ............ 709/206 |
| 7,013,149 B2 * | 3/2006 | Vetro et al. ................ 455/456.1 |
| 7,076,567 B1 * | 7/2006 | Chasman et al. ............ 709/248 |
| 7,369,745 B2 * | 5/2008 | Hamada et al. ................ 386/52 |
| 2002/0083145 A1 | 6/2002 | Perinpanathan |
| 2002/0103598 A1 * | 8/2002 | Nakamoto ................... 701/207 |
| 2002/0122344 A1 | 9/2002 | Takemura et al. |
| 2002/0198003 A1 | 12/2002 | Klapman |
| 2003/0018719 A1 | 1/2003 | Ruths et al. |
| 2003/0055927 A1 | 3/2003 | Fischer et al. |
| 2003/0079038 A1 | 4/2003 | Robbin et al. |
| 2003/0187574 A1 | 10/2003 | Herz et al. |
| 2004/0052504 A1 * | 3/2004 | Yamada et al. ................ 386/68 |
| 2004/0053625 A1 | 3/2004 | Bye |
| 2004/0058732 A1 | 3/2004 | Piccionelli |

OTHER PUBLICATIONS

Sousa et al, "AURA: An Architectural Framework for Suer Mobility in Ubiquitous Computing Environments", Software Architecture, System Design, Development and Maintenance, Proceedings of the 3rd Working IEEE/IFIP Conference, pp. 29-43, Aug. 2002.

Lei et al, "The Design and Applications of a Context Service", Mobile Computing and Communications Review, vol. 6, No. 4, Oct. 2002.

* cited by examiner

METHOD OF DATA SYNCHRONIZATION

The present invention relates to methods of determining synchronization policy in personal information-entertainment devices, and thereby realizing enhanced methods of data synchronization; in particular, but not exclusively, the invention concerns a method of synchronization in a personal information-entertainment device for periodically updating data content stored in memory of the device. Moreover, the invention also relates to apparatus, for example advanced personal information-entertainment products, capable of operating according to the methods. Furthermore, the invention also relates to systems and software operable to implement the methods.

Recently, numerous electronic products have been developed for personal entertainment susceptible to presenting audio and/or visual information to users. Such products, for example MP3 audio music players, have limited data storage capacity on account of one or more technical constraints, for example weight, operating power consumption and/or size. This limited storage capacity is less than that of bulkier computing devices such as personal computers (PC's), for example laptop computers. It has therefore become established practice for users of such electronic personal entertainment products to download, for example from their PC's or directly from communication networks such as the Internet, data content for relatively immediate presentation on their products; in other words, data stored in the products are frequently updated. Such updating is also known as "synchronizing" the memory contents of the products to a database, for example a PC.

The aforementioned synchronization of data is known and described in a recently published United States patent application no. US2004/0055927. In this application, there is elucidated a platform-independent framework that enables mobile devices, for example handheld computers, personal digital assistants (PDA's), Internet enabled telephones, laptop computers and desktop computers or the like to run business applications offline and synchronize data with a computer system. The system is optionally a business electronic commerce system communicating via a standard Internet connection or other network connection. Moreover, the framework allows the automated installation and/or de-installation of software applications into the mobile devices.

The inventors have appreciated that the manner in which such known data synchronization is contemporarily performed is not optimal. Updating memory contents of mobile devices involves a series of decisions regarding data stored in the mobile devices, for example:
(i) to delete data in the mobile devices;
(ii) to load back data into a larger capacity database such as a PC; and
(iii) to download data from the database into memory of the mobile devices.

Users of the mobile devices desire certain items of data content to be retained for longer periods in memory of the mobile devices than other types of data content. Thus, prioritizing and sorting data content in the mobile devices is potentially a complex and time-consuming process. For example, the inventors have appreciated that users may desire to keep personal address and telephone number databases permanently on their mobile devices, whereas they are often desirous to overwrite and update latest pop songs, contemporary news reports and such like downloaded and stored on their mobile devices on a daily basis.

The inventors have identified that smart synchronization strategies are needed for the mobile devices, especially as their complexity in the future increases, for example their memory capacity increases in line with technological advances in memory storage components such as solid state memory and small form format optical (SFFO) data carriers.

An object of the present invention is therefore to provide a better method of determining synchronization in personal devices.

According to a first aspect of the present invention, there is provided a method of data synchronization in a personal information-entertainment device operable to present data content to a user of the device, the method including steps of:
(a) arranging for the device to determine one or more contexts in which it is to be used; and
(b) updating data content stored in the device in response to the one or more contexts.

The invention is of advantage in that use of context information is capable of rendering synchronization of data content easier to implement.

Preferably, in the method, the updating comprises operations including at least one of:
(a) downloading data content from one or more data sources remote from the device into a memory of the device;
(b) at least partially deleting data content stored in the memory of the device;
(c) uploading data content from the memory of the device to one or more remote data stores; and
(d) rearranging data content stored in the memory of the device.

Accommodating such a range of updating options enables data content in the device to be selectively updated, thereby circumventing a need to reload all data content repetitively into the device.

Preferably, in step (a) of the method, the device is operable to determine the context from one or more of:
(a) personal information manager data;
(b) temporal information;
(c) device spatial position information; and
(d) heuristic data regarding patterns of selection exercised by the user of the device.

Use of such information in one or more of (a) to (d) enables the device to discern selectively which data content should be available on the device for the user at any particular location or time instance, thereby rendering data synchronization more efficient.

More preferably, the method further includes a step of including calendar data of the user in the information manager data for use in determining the one or more contexts. Calendar data is of benefit because it is potentially a valuable source of information for deriving the one or more contexts for determining choice of data content for synchronization to the device.

Preferably, the method includes a step of deriving said one or more contexts from temporal and/or location entries made in the calendar data. More preferably, in the method, the one or more contexts are derived by inference between a plurality of entries in the calendar data. Such inference is of benefit in that it reduces a need for the user to supervise operation of the device when selecting data content for synchronization.

Preferably, in the method, items of the data content are prioritized according to probability of relevance with reference to said one or more contexts and presented, when invoked by one or more contexts, to the user in an order dependent upon such prioritizing. Such prioritizing enables the device to take decisions regarding which items of data content to omit from its memory in situations where the device is required to store more data than its memory has capacity to handle.

Preferably, the method further comprises a step of recording whereat an interruption in user viewing and/or listening of one or more items of data content occurs for enabling subsequent resumption of viewing and/or listening from where interruption occurred. Such recording is of benefit for enabling the device to perform in a manner akin to a book with paper bookmarker for allowing repetitive and progressive access to the book.

Preferably, the method further comprises a step of arranging for the device to determine said one or more contexts and automatically updating the data content of the device in response to said one or more contexts. The automatic updating is of benefit in that it circumvents a need for the user to be preoccupied or interrupted on account of synchronization of the device.

Preferably, the method further comprises a step of arranging for the device to function as a personal digital assistant (PDA) for providing at least one of:
(a) an electronic calendar;
(b) an address and/or telephone number archive; and
(c) a communication interface for supporting text messages, audio dialogue and/or video dialogue.

Such PDA function enables the device to function in a synergistic manner because PDA activities potentially assist with determining policy for data content synchronization.

According to a second aspect of the invention, there is provided an apparatus arranged to synchronize data content to one or more remote data servers according to the method of the first aspect of the invention.

According to a third aspect of the invention, there is provided a system including at least one device and at least one data server mutually couplable for supporting data content transfer there between, the system arranged to function according to the method of the first aspect of the invention.

According to a fourth aspect of the invention, there is provided software on a computer-readable medium for executing on computer hardware for implementing the method according to the first aspect of the invention.

It will be appreciated that features of the invention are susceptible to being combined in any combination without departing from the scope of the invention.

Figure 2:
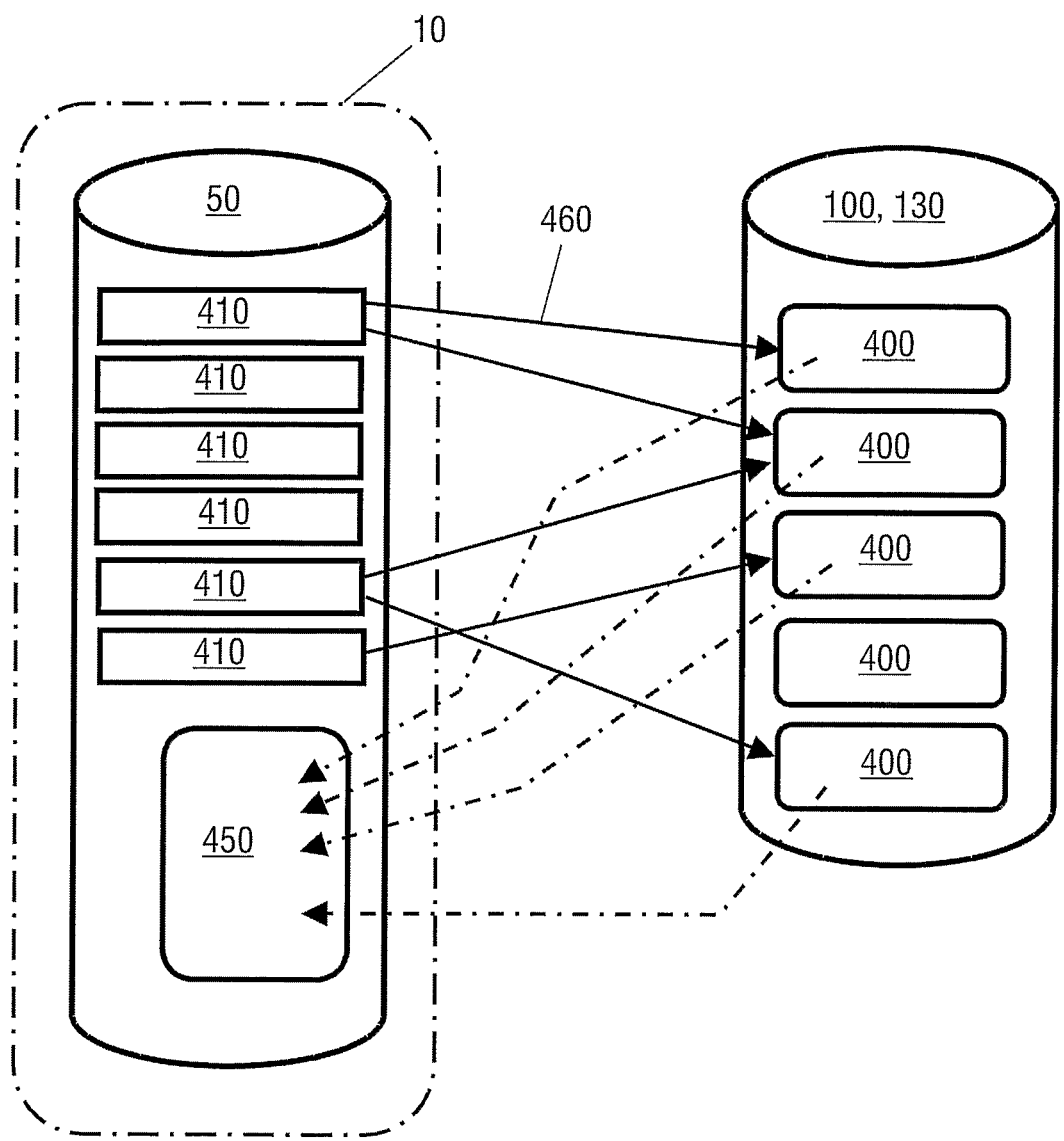

Embodiments of the invention will now be described, by way of example only, with reference to the following diagrams wherein:

FIG. 1 is a schematic diagram of a personal information-entertainment device coupled in communication with a personal computer and a server via a network; and FIG. 2 is a schematic diagram of associations made between personal information (PIM) and data content for use in deriving a strategy of synchronizing data content in the device of FIG. 1.

In order to elucidate the present invention, operation of a personal information-entertainment device will be described with reference to FIG. 1. In FIG. 1, the personal information-entertainment device is indicated generally by 10. The device 10 is susceptible to being transported by its user 20 in a manner akin to a wallet, spectacle case or contemporary MP3 player, for example in a jacket pocket of the user 20. The device 10 includes a user interface 30, for example at least one of an audio interface and a visual interface such as a pixel screen. Moreover, the device 10 includes computing hardware 40 coupled to a memory 50, to the user interface 30 and to a communications interface 60. The communications interface 60 is operable, when invoked, to enable the device 10 to communicate with a database. The database can be a server 100 included in a communications network 110 in communication 120 directly with the device 10. Alternatively, or additionally, the database can be a local apparatus such as a personal computer (PC) 130; optionally, the PC 130 can be coupled via the network 110 to the server 100.

In operation, the user 20 is capable of downloading data content from the PC 130 and/or from the server 100 via its network 110. Moreover, the user 20 is capable of deleting data content already stored in the memory 50. Furthermore, the user 20 is capable of overwriting data content stored in the memory 50. Yet furthermore, the user 20 is capable of transferring data content stored in the memory 50 to the PC 130 and/or to the server 100.

The server 100 is, for example, an Internet site distributing latest pop songs or recent news reports, weather reports, train timetables, bus timetables and such like. Similarly, the PC 130 is capable of providing similar types of data content as well as more personal information such as personal contact addresses and e-mails received at the PC 130 from the network 110.

Although the user 20 is allowed by the device 10 to control manually selection of data content to maintain and update on the device 10, such manual selection becomes cumbersome when the device 10 is relatively sophisticated and includes significant amounts of memory capacity, for example in excess of 1 Gbyte capacity in the memory 50. Moreover, sorting data content from title lists presented on the user interface 30 is relatively difficult when the interface 30 is of relatively limited visual resolution where long lists of titles, for example susceptible to be being viewed in a scrolled manner, can be problematic for the user 20 to interpret intuitively.

In order to address this problem, the device 10 is arranged to employ a smart synchronization strategy. The inventors have appreciated that the user 20 beneficially sorts or selects data content in response to context in which the user 20 wants to use the data content. Contexts are synonymous with at least one of physical location and user 20 activity. Examples of contexts are:
(a) commuting in a railway train;
(b) traveling by aircraft on a transcontinental flight;
(c) on vacation; and
(d) working in an office or factory.

The inventors have identified that the data content that the user 20 is most likely to select from the memory 50 is governed, at least in part, by a given context pertaining to the user 20 at any given instance of time, for example:
(1) when the context corresponds to commuting, the user 20 is most likely to desire to view and hear an account of news recorded a preceding evening, and a favorite show that has not yet been watched by the user 20;
(2) when the context corresponds to an intercontinental flight, the user 20 is most likely to desire to watch several feature-length movies, and to look at flight routes and/or geographical maps;
(3) when the context corresponds to vacation, the user 20 is most likely to desire to watch children's movies if the user 20 is a child, or to provide entertainment to a child of the user 20 when the user 20 is a parent; and
(4) when the context corresponds to a family visit, the user 20 is most likely to desire to present to family members latest home movies and family photographs.

The inventors have further appreciated that the device 10 is capable of functioning not only as an apparatus for presenting data content, but also synergistically operating as a contemporary Personal Digital Assistant (PDA). Such PDA's are computer-based devices arranged to execute software for providing a Personal Information Manager (PIM), such a manager functioning in a manner akin to an electronic interactive diary, an address book and a notepad for recording short notes relating to "things-to-do". PIM data is thus defined, for example, as data relating to the user's 20 personal circumstances and/or activities. Moreover, the inventors have identified that such PIM data can be beneficially used for automatically controlling synchronization of data content in the device 10 when coupled periodically, namely synchronized, with the server 100 and/or with the PC 130. PIM data of particular relevance is calendar information which not only provides an indication of the nature of a given activity of the user 20 but also a spatial location where the activity is to be executed and a time at which the activity is scheduled to occur. Entry of such calendar data is generally intuitive for the user 20 and can be input either via the user interface 30 or via the PC 130 for subsequent downloading, namely synchronization, to the device 10.

Software executing in the computer hardware 40 of the device 10 is capable of associating data content 400 stored in the server 100 and/or in the PC 130 for synchronization into the memory 50 with PIM data 410 in a manner as shown in FIG. 2 to result in stored synchronized data 450 in the memory 50; as an alternative, the software can be arranged to execute in at least one of the device 10, the PC 130 and the server 100. Such associations, for example an association 460, can be defined by the user 20, can be pre-defined by a party responsible for generating the data content 400, or can be generated by the device 10 itself based on previous selections exercised by the user 20, for example in a heuristics manner. For example, certain items of data content 400 can be invoked in conjunction with more than one context. Moreover, each item of data content 400 can be stored with associated attributes such as a time duration that it should be stored in the memory 50 and a priority rating for an order in which choices of data content are presented to the user 20 on the user interface 30 or deleted from the memory 50. The association 460 can thus be defined by way of Equation 1 (Eq. 1):

$$A = F(t, l, d, a, p, P) \quad \text{Eq. 1}$$

wherein
F=function defining association A
t=time of context
l=location of context
d=duration which data content should be stored in the memory
p=probability of given data content being required for a given context
P=a priority rating for presentation to the user 20.

The device 10 is also capable, on account of sophistication of software executing on the computer hardware 40, if inferring the associations, for example the association 460, indirectly. For example, location information included in the PIM data 410 regarding meetings and appointments and their associated spatial locations can be used to infer travel time to and from the meetings and appointments. For instance, if the PIM data 410 corresponding to calendar information wherein the calendar has two successive entries of appointments in two different parts of the memory 50, software executing of the hardware 40 of the device 10 is capable of discerning that there is some travel, for example commuting time, between the two appointments and use this discerned information to determine a most appropriate synchronization strategy.

The device 10 is preferably capable of using a wireless link to couple to the PC 130 and/or to the communication network 110. Preferably, software executing on the hardware 40 is arranged to cause the device 10 to synchronize its data content automatically by wireless without the user 20 needing to intervene. Moreover, the device 10 is optionally configurable to synchronize on demand as instructed by the user 20, for example in an event of the user 20 finding that the device 10 lacks a given preferred item of data content which the user 20 would have liked to have viewed. Such synchronization on demand is preferably invoked by the user 20 inputting instructions or commands at the user interface 30.

Software executing on the hardware 40 of the device 10 is also operable to log usage of the device 10 made by the user 20, for example to determine probabilities of the user 20 desiring to view certain types of data content at a given time each day or at a given location. Such a temporal log can be used in a heuristics manner to determine a data synchronization strategy for the device 10 as described earlier.

Beneficially, software executing in the hardware 40 is also operable to make a record of where in given data content the user 20 has viewed so as to enable the user 20 to resume viewing of the given data content at a later occasion; such operation of the device 10 is analogous to the user 20 inserting a bookmark into a paperback book at cessation of reading a passage in the book so that the user 20 can subsequently resume reading from where the bookmark was inserted into the book.

The user interface 30 is preferably implemented using flat-panel pixel liquid crystal device (LCD) technology to provide a screen for presenting images to the user 20. Alternatively, or additionally, the interface 30 is implemented using electronic ink, known as "E-ink", whose contrast and/or color is susceptible to being modulated in response to electric fields applied thereto; such electronic ink displays are potentially of benefit on account of their relatively low cost and substantially negligible operating power consumption. As a yet further option, the screen can be implemented using light emitting diode technology, for example polymer-LED technology, known contemporarily as "polyLED" technology or "OLED" technology. Such OLED's are fabricated from nanostructured polymer films and are capable of being deployed in arrays to form screens operable to emit light, these screens being potentially lighter, smaller and more energy efficient than conventional liquid crystal displays.

The interface 30 preferably also includes an acoustic transducer for sound generation, the transducer preferably being implemented as one or more of: a flat-panel loudspeaker, a planar piezo-electric element, headphones.

In order to assist data synchronization strategy, the device 10 is preferable equipped with GPS for determining its spatial position and using such position information in one or more modes:
(a) to control selection of data content to be synchronized from the PC 130 and/or the server 100; and/or
(b) to control selection of data content recovered from the memory 50 for selection by the user 20 for presenting on the interface 30.

Thus, determination of spatial position of the device 10 is beneficially used for determining context.

The device 10 is also preferably provided with an internal time reference, or is configured to receive an externally generate time reference, for example for use in interpreting and acting on PIM data, especially calendar data. Alternatively, or additionally, the time reference can be input to the device 10 by wireless via the communications interface 60, for example from a remote radio time clock and/or via the network 110.

The device 10 is preferably implemented in manner akin to a personal digital assistant (PDA) with enhancements according to the present invention.

In the accompanying claims, numerals and other symbols included within brackets are included to assist understanding of the claims and are not intended to limit the scope of the claims in any way.

It will be appreciated that embodiments of the invention described in the foregoing are susceptible to being modified without departing from the scope of the invention as defined by the accompanying claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

The invention claimed is:

1. A method of data synchronization in a personal information-entertainment device operable to present data content to a user of the device, the method including:
   determining, by the device, one or more contexts in which the device is to be used; and
   initiating, by the device, an update of data content stored in the device in response to the one or more contexts
   wherein the determining of the one or more contexts is based on at least one of:
      calendar data associated with the user,
      heuristic data regarding patterns of selection of data content exercised by the user; and
   wherein items of the data content are prioritized according to a probability of relevance with reference to each of the one or more contexts and presented, when invoked by one or more contexts, to the user in an order dependent upon such prioritizing.

2. The method of claim 1, wherein the updating includes at least one of:
   downloading at least a part of the data content from one or more data sources remote from the device into a memory of the device;
   at least partially deleting data content stored in the memory of the device; and
   uploading at least a part of the data content from the memory of the device to one or more remote data stores.

3. The method of claim 1, wherein the determining of the one or more contexts is based on at least one of: personal information manager data (PIM); temporal information; and device spatial position information.

4. The method of claim 1, including deriving the one or more contexts from temporal and/or location entries made in the calendar data.

5. The method of claim 4, wherein the one or more contexts are derived by inference from a plurality of entries in the calendar data.

6. The method of claim 1, recording a position whereat an interruption in user viewing and/or listening of one or more items of data content occurs, for enabling subsequent resumption of viewing and/or listening from the position where the interruption occurred.

7. The method of claim 1, including providing at least one of: an electronic calendar; an address and/or telephone number archive; and a communication interface for supporting text messages, audio dialogue and/or video dialogue.

8. A system including at least one device and at least one data server mutually couplable for supporting data content transfer therebetween, the system being arranged to function according to the method of claim 1.

9. A non-transitory computer-readable medium that includes a computer program for executing, on computer hardware, the method according to claim 1.

10. An apparatus arranged to synchronize data content to one or more remote data servers according to a method of data synchronization in a personal information-entertainment device operable to present data content to a user of the device, comprising:
    a processor, and
    a non-transitory memory element coupled to the processor;
    wherein the method includes:
       determining, by the processor, one or more contexts in which the device is to be used; and
       initiating, by the processor, an update of data content stored in the memory element in response to the one or more contexts;
    wherein the determining of the one or more contexts is based on at least one of:
       calendar data associated with the user, and
       heuristic data regarding patterns of selection of data content exercised by the user.

11. A method comprising:
    determining, on a portable electronic device, one or more future contexts associated with a user, without immediate input from the user specifying the context, the future contexts being relative to a current time, and
    initiating, by the portable electronic device at the current time, an update of content data on the device based on the one or more future contexts.

12. The method of claim 11, wherein the one or more future contexts are based on one or more of: an anticipated future location of the user, and calendar data associated with the user.

13. The method of claim 11, wherein the one or more future contexts are based on prior contexts of the user.

14. A device comprising:
    a memory,
    an interface that is configured to communicate with an external device, and
    a controller that is configured to determine a future context of a user relative to a current time, without an immediate input from the user specifying the future context, and to initiate transfer of content data at the current time to the memory from the external device based on the future context.

15. The device of claim 14, wherein the controller is configured to determine the future context of the user based on an anticipated future location of the user.

16. The device of claim 14, wherein the controller is configured to determine the future context of the user based on calendar data associated with the user.

17. The device of claim 14, wherein the controller is configured to determine the future context of the user based on prior contexts of the user.

18. The device of claim 14, wherein the device is a personal data assistant (PDA).

19. The device of claim 14, wherein the device is a personal computer (PC).

* * * * *